(12) United States Patent
Morrow et al.

(10) Patent No.: US 7,096,298 B2
(45) Date of Patent: Aug. 22, 2006

(54) REDUCED CARDBUS CONTROLLER

(75) Inventors: Neil Morrow, San Jose, CA (US); Richard Brayden, Saratoga, CA (US)

(73) Assignee: 02Micro International Limited, Grand Cayman (KY)

( * ) Notice: Subject to any disclaimer, the term of this patent is extended or adjusted under 35 U.S.C. 154(b) by 132 days.

(21) Appl. No.: 10/463,494

(22) Filed: Jun. 17, 2003

(65) Prior Publication Data
US 2004/0158665 A1    Aug. 12, 2004

Related U.S. Application Data

(60) Provisional application No. 60/446,590, filed on Feb. 11, 2003.

(51) Int. Cl.
G06F 13/00    (2006.01)
(52) U.S. Cl. .......................... 710/301; 710/10
(58) Field of Classification Search .................. 710/8, 710/10, 16, 17, 300–302, 304, 305, 306, 710/316
See application file for complete search history.

(56) References Cited

U.S. PATENT DOCUMENTS

| | | | |
|---|---|---|---|
| 6,636,904 B1* | 10/2003 | Fry et al. ..................... | 710/8 |
| 6,636,916 B1* | 10/2003 | Campbell et al. ............ | 710/266 |
| 6,807,597 B1* | 10/2004 | Oh et al. ...................... | 710/301 |
| 2001/0027032 A1* | 10/2001 | Inomata et al. ............... | 439/55 |
| 2004/0158751 A1* | 8/2004 | Lam et al. .................... | 713/320 |

OTHER PUBLICATIONS

PCI Local Bus, Mini PCI Specification, Revision 1.0, Aug. 13, 1999.*

Author unknown, Windows XP Professional Security, "Chapter 5: Operating System Enhancements", date unknown, pp. 111-136.
ISO/IEC, International Standard, Identification cards—Integrated circuit(s) cards with contacts—"Part 10: Electronic signals and answer to reset for synchronous cards", First edition Nov. 1, 1999, pp. 1-8.
ISO/IEC, International Standard, Information technology—Identification cards—Integrated circuit(s) cards with contacts—"Part 3: Electronic signals and transmission protocols", Second edition Dec. 15, 1997. pp. 1-27.
Personal Computer Memory Card International Association and Japan Electronics and Information Technology Industries Association (PCMCIA/JEITA), "PC Card Standard", Release 8.1, Dec. 2002, pp. 1-34.
Personal Computer Memory Card International Association and Japan Electronics and Information Technology Industries Association (PCMCIA/JEITA), "PC Card Standard", vol. 3: Physical Specification, 2002, pp. 1-71.
Taiwan Office Action with English translation from related Taiwan application (2 pgs).
English translation of Chinese Office Action from related Chinese application (1 pg).

* cited by examiner

*Primary Examiner*—Khanh Dang
(74) *Attorney, Agent, or Firm*—Grossman, Tucker, Perreault & Pfleger, PLLC

(57) ABSTRACT

A cardbus controller is provided that reduces signal count and board area. In one exemplary embodiment, the controller is adapted to multiplex selected signals in a two PC Card system so that signal lines are not repeated. The selected signals may include common signals between two PC Cards. The controller may also include early detection circuitry, arbitration circuitry and power management circuitry to more effectively operate two PC Cards. In other exemplary embodiments, the invention provides a method of reducing the chip area of a PC Card controller integrated circuit by mapping an internal IDSEL signal to an external address line.

5 Claims, 4 Drawing Sheets

| PCI IO 1 (101) | PCI IO 2 (102) | AUX IO (104) | PCI IO 3 (103) |

AUX VCC POWER (105)

PCI VCC POWER (100)

| PAD (104a) | PAD (104b) | PAD (104c) | PAD (104d) |

REDUCED CARDBUS CONTROLLER

The present invention claims priority to Provisional Application Ser. No. 60/446,590, filed Feb. 11, 2003.

FIELD OF THE INVENTION

This invention relates to the design, manufacturing, and implementation of semiconductor devices, and computer systems. More specifically, the present invention relates to the design, manufacturing, and implementation of semiconductor devices that provide PCI-CardBus functionality.

BACKGROUND OF THE INVENTION

Prior Art PCI-CardBus Footprint Background

There are several problems associated with the de-facto-standard PCI-CardBus footprints. One of the first-to-market PCI-CardBus controllers was brought to market in a 144-pin package, and was introduced by Texas Instruments in the 1997 timeframe, known as the PCI1210. It was a widely adopted product that bridges a PCI Local bus to a single PC Card socket enhanced with the 32-bit CardBus protocol. Texas Instruments also introduced a product that bridges a PCI Local bus to two independent dual PC Card sockets enhanced with the 32-bit CardBus protocol. This product, the PCI1130, was introduced in a 208-pin package, and was also widely adopted. The 208-pins accommodate the PCI signals, and two sets of signals specified by the PC Card Standard to allow for simultaneous operation of the two PC Card sockets.

Several companies developed products that are pin-compatible to the PCI1210, including Texas Instruments. TI's PCI1410 is pin-compatible, O2 Micro's OZ6912 is pin-compatible, Ricoh's R5C475 is pin-compatible, and most recently introduced ENE's CB1410 is pin-compatible. Millions of chips in this package footprint are sold each year to notebook computers and other PC Card enabled systems, and is well understood in the industry that TI introduced the de-facto-standard PCI-CardBus footprint and others followed.

As Texas Instruments rolls out new technology in the PCI1510 PCI-CardBus controller, it retains a high level of pin-compatibility with the de-facto-standard PCI1410 footprint, as set forth in the data manual for this part.

The concept of utilizing 208-pin packaging to provide simultaneous operation of the two PC Card sockets was also widely adopted. Texas Instruments continues this legacy with the new introduction of the PCI1520, and competitors including Ricoh, O2Micro, and ENE all provide simultaneous PC Card socket operations utilizing two sets of signals specified by the PC Card Standard.

Prior-Art Solution to Board Space Problem

Mini-PCI environments are often very board area constrained, as they are often used for mobile products that need to be small and light (e.g. notebook computers). The de-facto standard 144-pin package is 20 mm×20 mm in a QFP footprint and 13 mm×13 mm in the mBGA footprint. The mechanical differences between QFP and mBGA are provided in the PCI-CardBus data manuals. There is a significant cost delta between QFP and mBGA packages, due to materials, assembly, test fixtures, production volume, and other factors; however, several Mini-PCI systems implement the mBGA package for board savings and sacrifice the cost advantage of the QFP. However, the added expense on packaging provides no real functional value to the system.

The identical trade-off is made for 208-pin packaged dual socket PCI-CardBus bridge devices. The 208-pin package is 30 mm×30 mm in a QFP footprint, and 16 mm×16 mm in the mBGA footprint. Most Mini-PCI systems cannot accommodate the 208-pin QFP footprint, and it is very rare that a Mini-PCI system utilizes the 208-pin QFP. Instead, the added expense is typically made to utilize the 208-pin mBGA footprint, and no additional value other than board area is gained with this expense.

Prior-Art Solution to IO Leakage Problem

Mobile products that implement Mini-PCI are often equipped with a battery, and power consumption is therefore a critical concern. Several power management techniques have been implemented to reduce power consumption, many of which provide the option to remove PCI bus power. If any device signals connected to the PCI bus remain powered when the PCI bus power has been removed, there is a high possibility of leakage through those terminals. Leakage is getting to be a big concern in this industry, internal leakage and external leakage, as pointed out by Intel's leader Andrew Groves in a Wall Street Journal article Dec. 11, 2002.

Some of the multi-function terminals on the de-facto 144-pin package (typically named MFUNC6:0 or MF6:0 located at QFP terminals 60, 61, 64, 65, 67, 68, and 69) are used for PCI functions, such as interrupt signaling, exclusive access control via LOCK#, and PCI clock control. When configured for these PCI functions, it is desirable from a leakage standpoint to power them off when the PCI bus power is removed.

Terminals are typically grouped by IO power requirements. Two adjacent terminals with different power requirements delimit the groupings. The reason IOs are grouped by power requirements is to limit the number of IO power rings that are needed to route bus power to the IO cells around a chip. Adding more IO power rings increases die area and increases cost. The de-facto 144-pin package makes it difficult as the multi-function terminals are in a different grouping than the PCI terminals. The PME# signal located at the de-factor 144-pin location 59 is defined by the PCI Power Management specification as a signal that requires power when PCI power is removed. Thus, a grouping ends between pin 57 (PCI Powered Address/Data Signal AD0) and pin 59.

One prior art solution to this IO leakage problem, as illustrated in FIG. 1, is to add an IO power ring to bring both auxiliary power to the PME# signal and to provide the PCI power to signals routed to MFUNC terminals.

FIG. 1 shows a conventional method of providing two separate power sources to input/output cells in a chip that need different voltage levels, and are not cleanly grouped such that one power rail can be split into groups. PCI IOs 1, 2, and 3 (101, 102, 103) all need power from PCI VCC power supply 100. An IO cell 104 that requires power from an auxiliary power source 105 separates the PCI IOs. The addition of AUX VCC 105 can cause chip area to increase, and increase the cost of the chip.

SUMMARY OF THE INVENTION

Accordingly, in one exemplary embodiment, the present invention provides a system for operating PC Cards. The system includes a controller adapted to control at least two independent PC Cards. The controller is adapted to generate PC Card signal lines to control the operation of at least two independent PC Cards and further adapted to multiplex selected signal lines so that said selected signal are operable with at least two independent PC Cards.

In another exemplary embodiment, the present invention provides a method of reducing the chip area of a PC Card controller integrated circuit. The method includes the steps of selecting at least two power rails operable to supply power to PC Cards, rearranging selected IO pins of the integrated circuit; and grouping selected ones of the pins to couple to a selected one of the power rails.

In still other exemplary embodiments, the present invention provides a method of reducing the chip area of a PC Card controller integrated circuit that includes the step of mapping an internal IDSEL signal to an external address line.

The present invention shall make reference to the PCI Power Management Specification, the PCI Specification, the Mini-PCI Specification, and the PC Card Standard. It is understood herein that one skilled in this art will be familiar with these industry standards, as well as other standards in the PCMCIA/SmartCard/CardBus and expansion card technologies, and such material shall be considered background material for the present invention.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

BRIEF DESCRIPTION OF THE DRAWINGS

FIG. 1 shows a conventional method of providing two separate power sources to input/output cells in a chip that need different voltage levels;

DETAILED DESCRIPTION OF THE INVENTION

In the past PCI-CardBus Controllers were designed to support PCI systems. PCI systems are designed to comply with the PCI Specification that can support up to 10 electrical loads; some of these electrical loads can be PCI slots. The PCI system electrical characteristics are flexible and configurable.

The targeted specific environment for the enhanced PCI-CardBus footprint is called a "Mini-PCI Motherboard Environment". The Mini-PCI Specification defines a smaller form factor connector for small-form-factor PCI-based products, such as thin and light notebook computers. As with a PCI motherboard, devices on the Mini-PCI motherboard are designed into the system, that is, they do not appear on expansion boards. Devices on the motherboard can be customized to meet motherboard-specific addressing and configuration options e.g. SMBus configuration and system BIOS configurations) that are not available for expansion board devices. The PCI Specification calls out different requirements for PCI motherboard devices, versus those on expansion boards. For example, Section 3.7.2 of the PCI Specification defines parity checking requirements different for motherboard devices than expansion devices.

Figure 2:
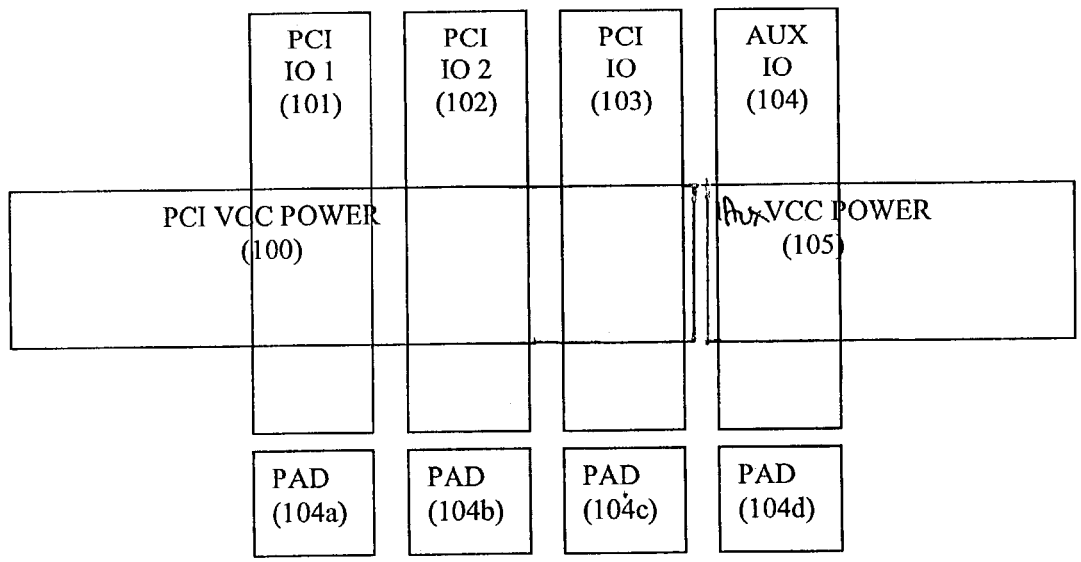
FIG. 2 depicts an exemplary regrouping of signals according to the present invention.

IO Leakage:

The signals INTA# and CLKRUN# and IRQSER and typically utilized in mini-PCI environments, and are routed to de-factor 144-pin QFP terminals 60,65, and 69 respectively, and there is typically leakage through these signals when the PCI bus power is removed. The present invention relocates these signals to the PCI bus power grouping, which enables them to be powered down with the PCI bus power input without any additional power rail design in the chip. FIG. 2 depicts an exemplary regrouping of signals according to the present invention. FIG. 2 depicts how the regrouping of the signals in FIG. 1 can also rearrange a power rail. As depicted the IO signals 101, 102 and 103 are grouped with power rail 100, and IO signal 104 is grouped with power rail 105. As shown in FIG. 2, for example, power rail 100 can be arranged to overlap only with 10 signals 101, 102, and 103. Similarly, power rail 105 can be arranged to overlap only with IO signal 104. Of course, this is only exemplary, and those skilled in the art will recognize that many such grouping can exist depending on the number of pins available. All such grouping are deemed with the spirit and scope of the present invention.

Board Area:

The 128-pin QFP package is 18 mm×18 mm when a square package is used and pin pitch is 0.5 mm, a 19% reduction in package area over the 144-pin de-facto QFP for PCI-CardBus. The present invention provides a reduced pin PCI-CardBus device. For example, the present invention may be used to implement the 128-pin QFP for the reduced PCI-CardBus device.

The Mini-PCI environment is a controlled environment. Although Section 3.2.2.3.5 of the PCI Specification clearly states that a PCI device "cannot make an internal connection between an AD line (address line) and an internal IDSEL signal in order to save a pin", they give an exception for the host bridge. The present invention expands on that exception in that a controlled Mini-PCI environment, the IDSEL mapping is fixed to an address line for device on the motherboard; thus, the terminal can be removed. Accordingly, the present invention provides a device that removes the IDSEL terminal for Mini-PCI environments to achieve the invented 128-pin PCI-CardBus device.

One exemplary methodology for removing the IDSEL pin includes the process of samples the VCCD0 and VCCD1 signals during the reset period (during PCI_RESET# assertion and immediately following for a few PCI clocks), to determine the IDSEL mapping to an AD31:16 signal. For example: Sampled on reset {VCCD0, VCCD1}

00—AD18 is used as IDSEL connection

01—AD20 is used as IDSEL connection

10—AD24 is used as IDSEL connection

11—AD25 is used as IDSEL connection

Those skilled in the art will recognize the VCCD0 and VCCD1 signals as part of the specification. During the design phase of a Mini-PCI system, the electrical characteristics of the power and ground source to the PCI-CardBus device can be carefully tuned. Thus, by targeting these systems, less power and ground terminals can be used.

Reduction of power and ground terminals is one step to achieve the 128-pin PCI-CardBus device of the present invention.

One particular power signal that is not necessary is the VCCB signal on the de-facto footprint, also called SOCKET_VCC. This signal can be used to either power the IO cells, or to provide clamping protection per the PC Card Standard AC specifications for CardBus per Section 5.3.2.1.2. Accordingly, the present invention provides a PCI-CardBus device that requires the CardBus power supply is connected externally to the PCI-CardBus power supply to the IOs, eliminating the need for the this VCCB terminal to achieve a 128-pin PCI-CardBus device.

Today's Mini-PCI systems may have only one or two PCI slots with a few soldered connections. The present invention recognizes that CardBus controllers can be designed to be more cost effective when used in Mini PCI environments supporting less than IO PCI slots.

Figure 3:
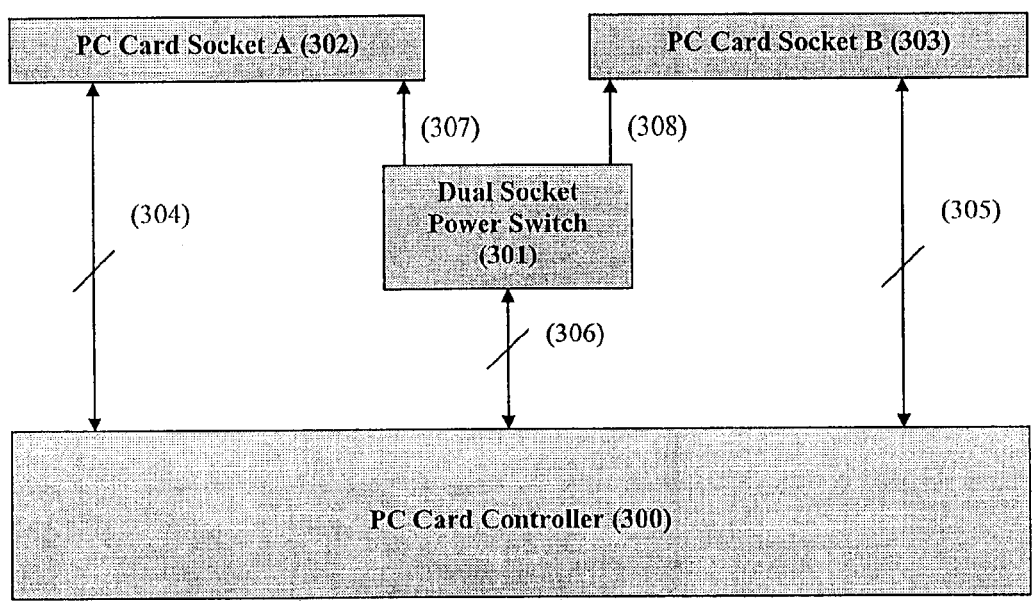
FIG. 3 is a block diagram of a conventional PC Card controller that provides two separate PC Card socket interfaces that support simultaneous operations.

In reference to FIG. 3, conventional dual socket PC Card controllers (300) require a large number of signals to support simultaneous operations on the PC Card socket A interface (302) and the PC Card socket B interface (303). Conventional dual socket PC Card controllers (300) provide independent paths for the PC Card socket A signals (304) and the PC Card socket B signals (305), requiring a large number of inputs and outputs. The PC Card Standard defines a 68-pin interface per socket. It is conventional for dual-socket PC Card controllers (300) to communicate power requests to the PC Card sockets using a control signal group (306) that connects to a dual socket PCMCIA power switch device (301). Power is supplied to the PC Card sockets by outputs (307) and (308) from the power switch device (301).

Figure 4:
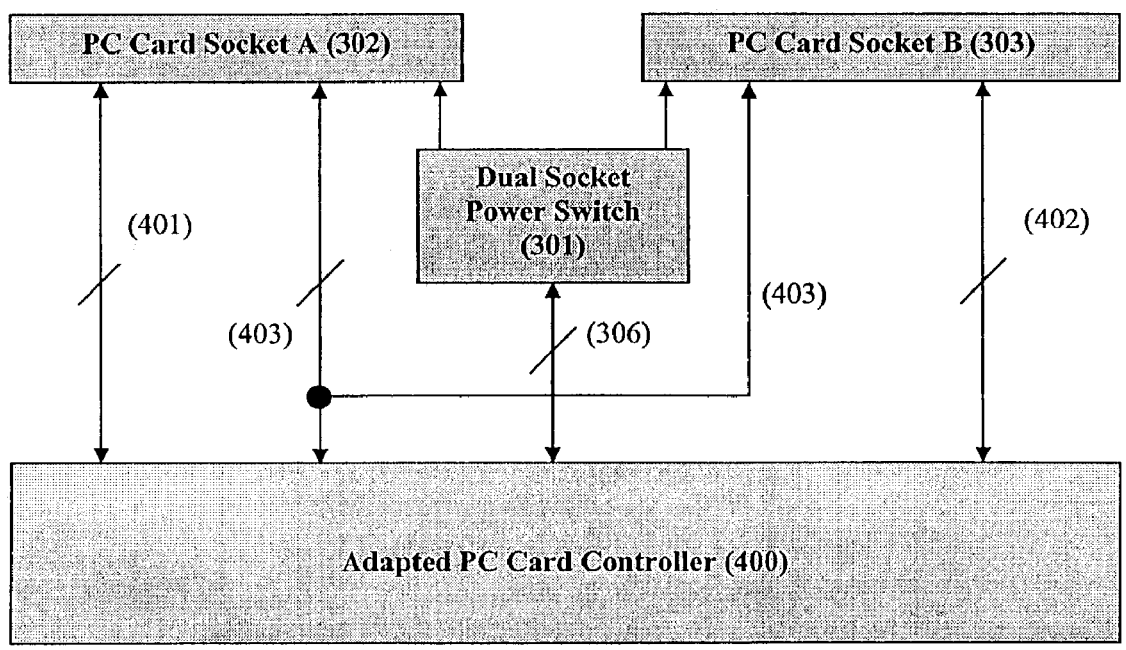
FIG. 4 is a block diagram of a PC Card controller according to the present invention.

FIG. 4 illustrates a block diagram of a PC Card controller of the present invention. The PC Card 400 of this embodiment multiplexes signals between two PC Card socket interfaces, eliminating simultaneous operations. With this controller, the total signal count on the PC Card Controller can be reduced, saving silicon cost, package cost, and reducing board area of the package.

The signals that remain independent per socket are only active when an operation is in progress on the respective socket interface, and these are called socket control signals: (401) and (402). The socket control signals are identified as socket independent signals that maintain proper protocol, or must be independent for electrical purposes (e.g. different voltage requirements). In the preferred embodiment, the socket control signals are PCMCIA-16 "chip enable" signals, PCMCIA-16 "data" signals, the CardBus "clock" signal, and the CardBus arbitration signals "REQ#" and "GNT#". The PCMCIA-16 outputs from the card are classified as control signals because they can be asserted at 5 Volt levels, which is not compatible with CardBus 3 Volt levels.

The shared signals (403) are active when an operation is in progress on either the PC Card socket A interface (302) or the PC Card socket B interface (303). In the preferred embodiment, the shared signals are at a minimum the PCMCIA-16 "address" signal or a CardBus "address/data" signals as defined in the PC Card standard. The shared signals (403) plus the control signals (401) and (402) make up the set of PC Card signals defined in the PC Card standard, as represented by signals (304) and (305) of FIG. 3.

There are several design considerations when adapting a dual socket PC Card controller to perform the multiplexing function described above. The design may include circuitry to early-detect insertion events, circuitry to place either one or both socket interfaces in a hold (i.e. no operation) state, multiplexing arbitration circuitry, and/or circuitry to accommodate power managed systems. These types of circuits are not depicted here because they are not necessary for an understanding of the present invention.

Early detection of insertion events may be desirable to ensure signal quality on the shared signals when a second PC Card is inserted. For example, if an operation is in progress on a first card in PC Card socket A (302), and a second card is inserted into PC Card socket B (303), the shared signals (403) may be at an unknown state for some period of time during and after the insertion event due to unknown charge levels of capacitances on the shared signals routed to PC Card socket B, or unknown coupling to the discharged socket B power supply (308).

The preferred solution to this problem is to provide early-detection notification of the second card insertion to the adapted PC Card controller (400), place the first PC Card socket interface in a hold condition, and wait for the power supply to be activated to the second PC Card socket. The power may either be controlled by system software, or automatically controlled by the PC Card controller with the control signals (306) connected to the PC Card power switch device.

The preferred early-detection notification is accomplished by utilizing the PC Card Standard pin-length definition for VCC/GND pins on the PC Card connector. The pin-length definition for the 68-pin PC Card connector is given in Section 4.2 of the PC Card Standard's "Physical Specification." The Power/Ground pins are 0.75 mm longer than General signals. As long as the shared signals (403) fall into the "General" signal category per the PC Card Standard, the identification of the Power/Ground connection can provide early-detection notification. This can be accomplished with an input to the adapted PC Card controller with a pull-up resistor, connected to a Ground signal from the 68-pin connector, that will be connected to Ground when a PC card is inserted and made contact with the connector (i.e. the 0.75 mm longer Power/Ground pins have made contact)—otherwise pulled to a high logic level.

The method of placing one card in a "hold" condition depends on the type of PC Card inserted. For CardBus cards, the card-target operations can be placed on hold by performing one of the master-initiated termination protocols per the PCI and CardBus protocol specification. The CardBus card-master operations can be placed on hold by de-asserting the bus grant signal GNT# to the CardBus card, and performing one of the target-initiated termination protocols per the PCI and CardBus protocol specification. Additionally, the CardBus clock signal may be stopped during the hold condition.

For PCMCIA-16 cards, the card is always a target per the PC Card specification. The operations to the PCMCIA-16 are highly controlled by the PC Card controller, and can be early-terminated by the PC Card controller by de-asserting the chip-enable signals. The chip-enable signals may remain deasserted during the hold period.

The controller 400 may also be adapted to arbitrate between the two PC Card sockets. Generally, arbitration for use of the multiplexed shared interface depends on the type of PC Cards inserted. One method is to use a conventional time-division-multiplexing scheme, which would allow one socket to perform an operation, and then allow the second to perform an operation, etc. The preferred solution to arbitration is to use the CardBus card REQ# signal to identify card-initiated operation requests for CardBus cards. For PCMCIA-16 cards and for CardBus target cycles, the PC Card controller initiates the operations, and preferably uses a fair arbitration method to initiate these operations.

To accommodate power managed systems, it may be desirable that power remains applied to both sockets when an operation is performed on either socket. Some systems will turn off power to a socket when the PC Card in the socket is not utilized. These are power managed systems. Circuitry in the adapted PC Card controller 400 may be included to maintain power to both sockets when an operation is performed on either socket. This can be accomplished by denying host system requests to disable power, and overriding software power requests and controlling power directly with the PC Card power switch control interface (306). In the preferred embodiment, the adapted PC Card controller 400 automatically powers the PC Card sockets when a card is inserted, automatically removes power from the socket when the PC Card is removed, and ignores power requests made by host system software.

The present invention may include one or more of the following features:

A) Externally connect 3V source power to the PCMCIA switch for CardBus power to the CORE_VCC rail that powers the CardBus IO drivers on a PCI-CardBus device, eliminating the need for VCCB (a.k.a. SOCKET_VCC terminals) to still comply with PC Card Standard AC specifications in Section 5.3.2.1.2

B) Reduce leakage through MF terminals that provide PCI functionality by re-locating the terminals to the PCI power grouping, eliminating the added die-cost of implementing dual power-rings C) Adapt a general purpose PCI-CardBus device to the functional environments of Mini-PCI motherboard systems to reduce power/ground requirements and several pin-functions and operate in a 128-pin package under specific conditions that are controllable in the motherboard environment.

D) Provide a pull-up/pull-down configuration option on the VCCD0 and VCCD1 signals to configure which PCI_AD31:16 signal is internally connected to the IDSEL signal in a PCI device.

E) Multiplexing PC Card "shared" signals by a dual-socket PC Card controller; thereby, reducing the signal count on the PC Card controller. The reduction in signal count accomplished by multiplexing may provide smaller-footprint packaging options.

Those skilled in the art will recognize numerous modifications to the present invention. For example, the preceding Detailed Description provided a reduced CardBus controller. However, those skilled in the art will recognize that the present invention can be used for other expansion card technologies, that may include SmartCard, PCMCIA, and/or other emerging expansion technologies like flash memory devices (e.g., Memory Stick, Secure Digital, Compact-Flash), and/or other expansion technologies. Likewise, specific methodology is provided herein to alleviate IO leakage problems and to reduce board area and pin count. However, these specific examples may be generalized following the principles set forth herein to target other signals for reduction. All such modifications are deemed within the spirit and scope of the present invention, only as limited by the claims.

The invention claimed is:

1. A method of reducing the chip area of a PC Card controller integrated circuit, comprising:

arranging a first power rail having a first voltage and a second power rail having a second voltage, each said power rail operable to supply power to PC Cards;

grouping pins of said integrated circuit into a first group of pins and a second group of pins;

coupling said first power rail with said first group of pins and coupling said second power rail with said second group of pins; and overlapping said first power rail only with said first group of pins and overlapping said second power rail only with said second group of pins.

2. The method of claim 1, said method further comprising mapping an internal IDSEL signal within said PC Card controller integrated circuit to an external address line of a bus, thereby removing a pin from said PC Card controller integrated circuit.

3. The method of claim 2, further comprising sampling VCCD0 and VCCD1 signals, as defined by a PCI Specification, during a reset period of said integrated circuit to determine which address line to map said IDSEL signal.

4. A method of reducing the chip area of a PC Card controller integrated circuit, comprising the step of:

sampling VCCD0 and VCCD1 signals, as defined by a PCI Specification, during a reset period of said integrated circuit to determine which address line to map a IDSEL signal; and mapping an internal IDSEL signal within said PC Card controller integrated circuit to an external address line of a bus.

5. The method of claim 4, further comprising arranging a first power rail having a first voltage and a second power rail having a second voltage, each said power rail operable to supply power to PC Cards;

grouping pins of said integrated circuit into a first group of pins and a second group of pins;

coupling said first power rail with said first group of pins and coupling said second power rail with said second group of pins; and overlapping said first power rail only with said first group of pins and overlapping said second power rail only with said second group of pins.

* * * * *